(12) United States Patent
Jokinen

(10) Patent No.: US 7,126,801 B2
(45) Date of Patent: Oct. 24, 2006

(54) POLARITY PROTECTION IMPLEMENTED WITH A MOSFET

(75) Inventor: Sami Jokinen, Helsinki (FI)

(73) Assignee: Tellabs Oy, Espoo (FI)

(*) Notice: Subject to any disclaimer, the term of this patent is extended or adjusted under 35 U.S.C. 154(b) by 183 days.

(21) Appl. No.: 10/495,601

(22) PCT Filed: Dec. 12, 2002

(86) PCT No.: PCT/FI02/01009

§ 371 (c)(1),
(2), (4) Date: May 14, 2004

(87) PCT Pub. No.: WO03/052896

PCT Pub. Date: Jun. 26, 2003

(65) Prior Publication Data

US 2004/0264084 A1    Dec. 30, 2004

(30) Foreign Application Priority Data

Dec. 17, 2001    (FI) .................................. 20012483

(51) Int. Cl.
*H02H 3/18*    (2006.01)
*H02B 1/24*    (2006.01)

(52) U.S. Cl. ............................ 361/85; 307/127; 361/82

(58) Field of Classification Search ............... 307/127; 361/82, 84

See application file for complete search history.

(56) References Cited

U.S. PATENT DOCUMENTS

| 5,764,465 | A | 6/1998 | Mattes et al. ................. 361/77 |
| 6,429,550 | B1* | 8/2002 | Braun et al. ................ 307/127 |
| 6,519,126 | B1* | 2/2003 | Tamura ....................... 361/84 |
| 6,611,410 | B1* | 8/2003 | Makaran ...................... 361/84 |
| 6,657,839 | B1* | 12/2003 | de Oliveira ............... 361/91.6 |

FOREIGN PATENT DOCUMENTS

| DE | 40 31 288 | 10/1990 |
| DE | 43 26 423 | 8/1993 |
| DE | 100 13 939 | 3/2000 |
| EP | 0 918 389 | 5/2000 |
| WO | 00/14847 | 3/2000 |

* cited by examiner

*Primary Examiner*—Brian Sircus
*Assistant Examiner*—Hal I. Kaplan
(74) *Attorney, Agent, or Firm*—Young & Thompson

(57) ABSTRACT

A polarity protection circuit contains a metal oxide semiconductor field effect transistor (FET) that pets its control voltage via an electrical connection from supply voltage lines and a transistor that pets its control voltage via another connection from the supply voltage lines. When a supply voltage has a wrong polarity the FET is in a non-conducting state. If in the supply voltage lines during normal operation there occurs a short circuit that tends to chance a direction of the current, the transistor rapidly discharges a gate charge of the FET, and the current flow in the wrong direction is prevented.

4 Claims, 2 Drawing Sheets

POLARITY PROTECTION IMPLEMENTED WITH A MOSFET

TECHNICAL FIELD

The invention relates to the use of a metal oxide semiconductor field effect transistor (MOSFET) as polarity protection, and particularly to a transistor control circuit, which can be implemented in a manner as simple and advantageous as possible.

BACKGROUND OF THE INVENTION

Electronic circuits are often protected against wrong polarity. The task of the polarity protection is to enable a current flow only in one particular direction. A current in the opposite direction can be caused e.g. by a battery or cable connected in a wrong way in installation stage. Then the polarity protection prevents short-circuiting of the battery and destruction of components. The polarity protection secures the operation of the equipment, also during a momentary short circuit in the battery's supply line. If there is a momentary short circuit or a lowered voltage in the supply lines between the battery and the load, then the capacitors connected in parallel with the load will maintain the voltage supplied to the load, and an operating polarity protection prevents a current in the opposite direction from discharging these capacitors via the supply lines.

Polarity protection is required particularly in telecommunications equipment where even a momentary break can cause annoying disturbances in the operation. A diode is the most common and generally used component in polarity protection. Further it is well known to use as polarity protection such electronic components, which can be switched on and off. For instance transistors are such components.

In the publication DE 4 031 288 C1 a diode is located between the gate of a field effect transistor (FET) and the opposite supply line, whereby the gate capacitance of the field effect transistor (FET) can be discharged through the diode if there occurs a supply voltage with the wrong polarity. Thus said publication uses the field effect transistor (FET) as the protective component and the diode as its controlling circuit. It is also possible to use a diode directly in the polarity protection. However, a diode has a considerable loss of power, particularly at higher currents.

A positive feature of a transistor is that its operation can be controlled by one electrical signal. If there is no gate voltage, then the transistor is in its passive, non-conducting state. A sufficiently high positive gate voltage puts the transistor into the conducting state, in which particularly a channel resistance of a FET induces only a low power loss. In polarity protection the control circuit switches the transistor into the conducting state when the polarity is correct, and into the non-conducting state if the polarity is wrong.

The publication U.S. Pat. No. 5,764,465 presents a circuit where the polarity protection utilises a p-channel MOSFET. The main parts of a MOSFET can be called drain, source and gate. The presented circuit will be discussed with the aid of FIG. 1. The MOSFET 13 is connected to the transistors 12 and 15. The emitter of the transistor 12 is connected to the positive terminal 11 of the supply voltage, and its collector via the resistor 17 to the negative terminal 16 (ground) of the supply voltage. These supply voltages 11, 16 are then connected to the voltage source of a device requiring polarity protection. The base of the transistor 12 is connected to its collector. The drain (D) of the MOSFET 13 is connected to the positive terminal 11 of the power supply, and the voltage to the gate (G) is supplied via the resistor 18 from the negative terminal 16 of the power supply. The source (S) of the MOSFET 13 is connected to the output 22 of the circuit, and the output is connected to the ground 16 via the resistor 20. A capacitor 21 is connected in parallel with the resistor 20. The resistor 19 is connected to the bases of the transistors 12 and 15. The collector of the transistor 15 is connected to gate (G) of the MOSFET 13. The emitter of the transistor 15 is connected to the source (S) of the MOSFET 13. A zener diode 14 is connected between the source (S) of the MOSFET 13 and the collector of the transistor 15. In this diagram the transistors 12 and 15 form a comparison circuit. They are included in the control circuit of the MOSFET, and with the aid of them the current flow through the MOSFET 13 is prevented if the direction of the current changes. If the drain-source voltage (DS) of the MOSFET 13 changes and becomes negative, then the transistor 15 is activated. This in turn will switch off the MOSFET 13. Thus the charge is substantially maintained in the capacitor 21.

The known polarity protections realised with a MOSFET have problems regarding the complex control circuit, the expensive structure and/or the slow function. For instance telecommunication equipment often utilise large capacitors in the battery line, and a short circuit between the battery line and the power supply unit will discharge the capacitors if the system does not have an active polarity protection. The control circuit of the transistor in the polarity protection must be able to put the transistor into the non-conducting state in a sufficiently rapid manner, so that there is no time for the capacitors to discharge through the short circuit, but maintain the voltage supplied to the device.

SUMMARY OF THE INVENTION

The object of the invention is to realise a polarity protection with the aid of a MOSFET. A further object of the invention is to simplify the design of the control circuit of the MOSFET and to guarantee a sufficiently rapid operation of the control circuit.

The object is realised so that the gate voltage of the MOSFET is rapidly discharged with the aid of another semiconductor switch when a wrong polarity occurs.

The invention is characterised in what is said in the characterising part of the independent claim. Other advantageous embodiments of the invention are presented in the dependent claims.

According to the invention the polarity protection arrangement utilises an n-channel MOSFET having a low channel resistance, which guarantees that the power loss in the transistor is minimal and substantially less than in a diode, for instance.

The n-channel MOSFET connected to the negative battery line is controlled so that a control voltage is supplied from the positive supply voltage line via a resistance to its gate (G). In addition a rapid semiconductor switch is connected between the gate (G) and the source (S), whereby the control voltage to this switch is also supplied from the positive supply voltage line.

The control circuit operates so that, if there occurs a short circuit at the input side, the said rapid semiconductor switch will rapidly discharge the gate voltage of the MOSFET. Thus the capacitors will have almost no time to discharge through the short circuit. During normal operation the semiconductor switch is kept in a non-conducting state.

The power loss is low in the solution according to the invention. In addition the control circuit is simple. The MOSFET can be rapidly controlled into the non-conducting state in case the battery voltage is short-circuited. When the MOSFET is in the non-conducting state no current can flow in the wrong direction, and it will not destroy any components.

BRIEF DESCRIPTION OF DRAWINGS

The basic solution according to the invention is discussed in more detail with the accompanying figures, in which.

DETAILED DESCRIPTION OF THE INVENTION

Figure 1:
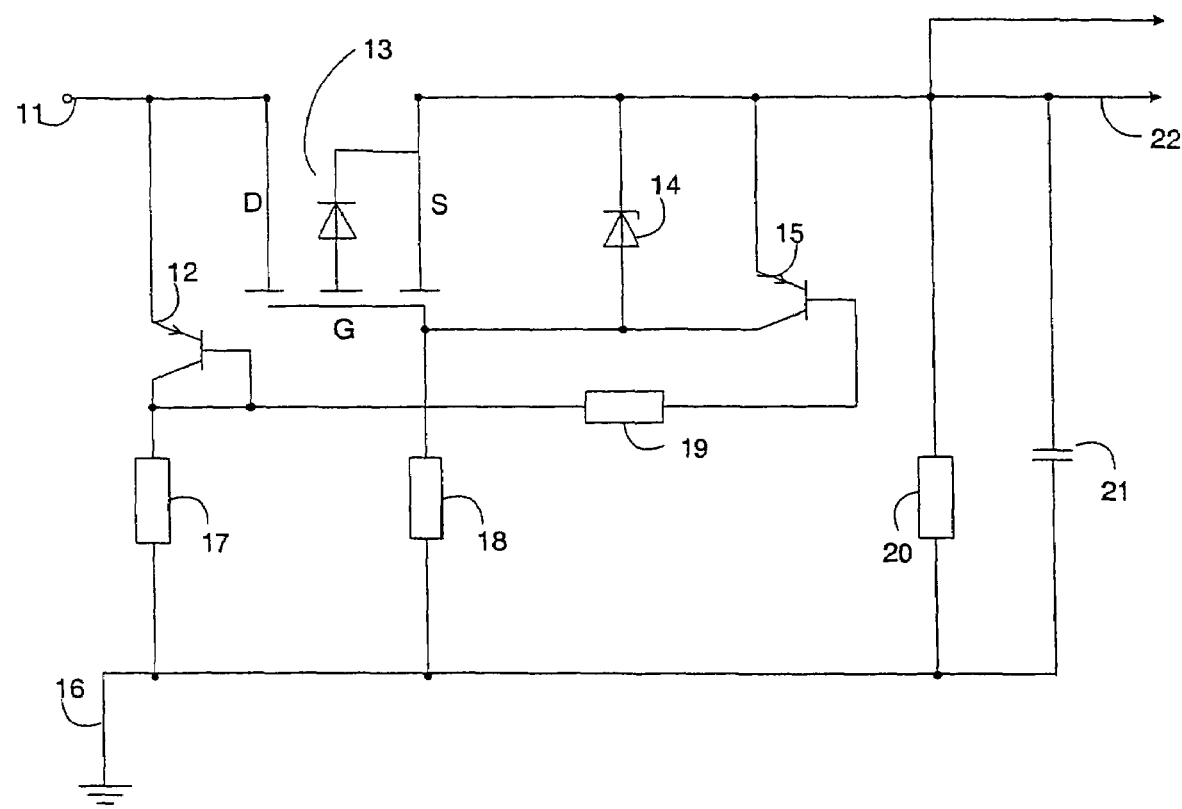
FIG. 1 shows a prior art arrangement for polarity protection.
Figure 2:
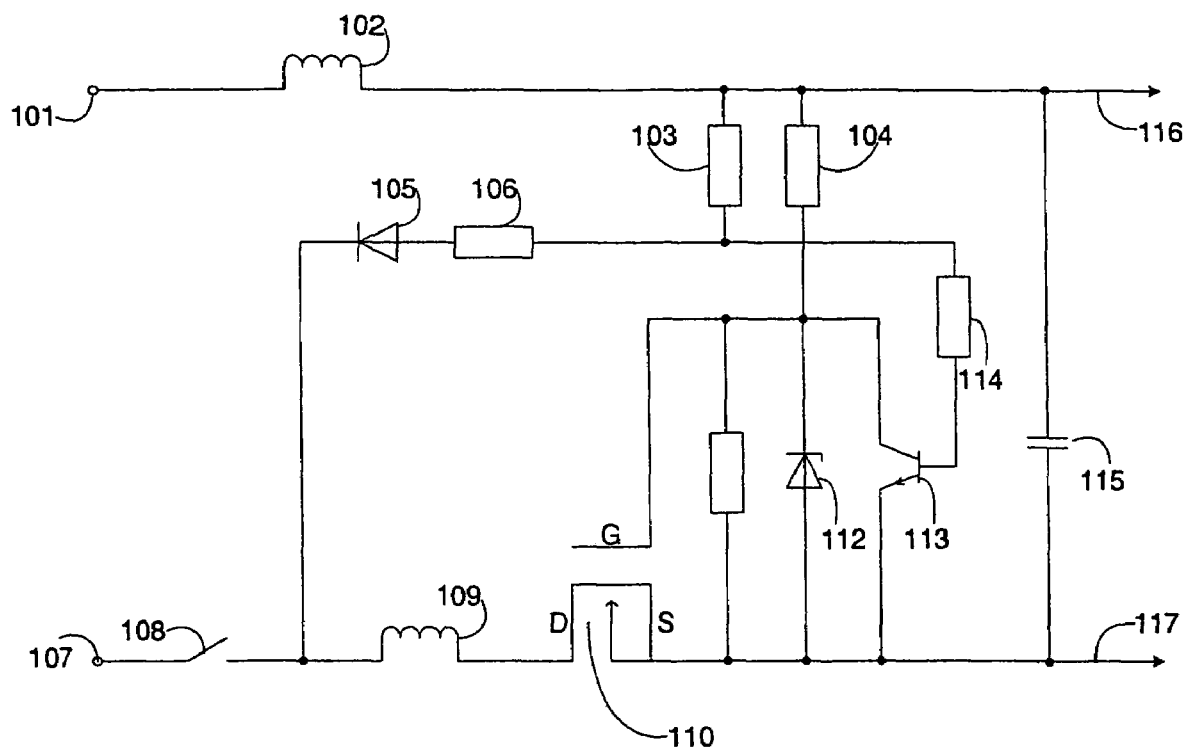
FIG. 2 shows an arrangement for polarity protection according to an advantageous embodiment of the invention.

In the embodiment shown in FIG. 2 a device, i.e. the load, utilising the polarity protection is connected to the output of the illustrated protective circuit, to its positive 116 and negative 117 terminals. The voltage used by the load is supplied from the positive 101 and negative 107 terminals of a power supply, for instance a battery. The current flows from the positive terminal 101 of the power supply to the load 116. The coil 102 acts as a part of the electromagnetic protection (EMC) protection, so that it retards changes occurring in the current. The resistance 103 is selected to be so large that the voltage divider circuit via the resistor 106 to the diode 105 or via the resistor 114 to the base of the transistor 113 consumes almost no current in normal operation. In addition the circuit contains a capacitor 115 in front of the load.

The current coming from the load 117 flows through the MOSFET 110, the coil 109 and the switch 108 to the negative terminal 107 of the power supply when the switch 108 is closed.

The n-channel MOSFET 110 used as the polarity protection is connected to the negative terminal of the battery, so that its source (S) is connected to the negative terminal 117 of the load, the drain (D) is connected via the coil 109 and the switch 108 to the negative terminal 107 of the battery, and the gate (G) via the resistor 104 to the positive terminal 116 of the load, and via the resistor 104 and the coil 102 to the positive terminal 101 of the battery. The gate voltage is limited for instance by a zener diode 112 shown in the figure, whereby the zener diode is also connected via the resistor 104 to the positive terminal 116 of the load.

A switch 108 is located between the negative terminal 107 of the battery and the MOSFET 110, and with this switch the whole system can be switched on/off. The coils 102 and 109 form a part of the EMC protection, and they retard changes in the current.

The gate voltage of the MOSFET 110 is kept negative if the battery has the wrong polarity, or if it is connected in the wrong direction in the installation stage, so that the current tends to flow in the wrong direction. Therefore the MOSFET is kept in the non-conducting state, and no current can flow through it in the wrong direction. If there is for instance a short circuit in the battery supply during normal operation, the capacitor 115 tends to discharge through the coils 102, 109 and the MOSFET 110. If there is a very rapidly passing short circuit or some other disturbance in the battery or between the battery and the capacitor 115, then the high capacitance capacitor 115 is intended to maintain the voltage supplied to the load. The MOSFET 110 must become non-conducting as fast as possible in order to prevent the capacitor 115, which acts as a back-up power supply, from being discharged due to a short circuit or some other voltage drop in the battery line. This is accomplished by discharging the gate charge of the MOSFET 110 with the aid of an npn-transistor 113. The base of the transistor 113 is connected via the resistors 114 and 103 to the positive terminal 116 of the load, and further via the coil 102 to the positive terminal of the battery. During normal operation the transistor 113 is kept in the non-conducting state by connecting its base, either only via said resistor 114 or, as shown in the figure, in addition via the resistor 106 to the anode of the diode 105, whereby the cathode of the diode 105 is connected to the negative terminal 107 of the battery via the switch 108, in front of the coil 109.

The coils 102 and 109 retard changes if the current between the battery and the load tends to change its direction, whereby a voltage is created over the coil 109. Then also the voltage at the cathode of the diode 105, which is connected to the negative terminal of the battery in front of the coil 109, will become higher than at the point 117. When the diode 105 ceases to conduct a base current is supplied to the transistor 113. Then the transistor 113 is activated and it discharges the gate charge of the MOSFET 110. The cathode of the diode 105 can be connected also directly to the drain (D) of the MOSFET 110, but in this point the voltage rises considerably slower in a short circuit case, and the current can flow in the wrong direction during a short period. Due to the coil 109 the polarity protection is sufficiently rapid, whereby a current in the wrong direction can be completely avoided.

The polarity protection arrangement according to the invention utilising a MOSFET, and its control circuit, contain a minimum of electronic components, so that the design of the circuit is very simple. Due to the MOSFET the power loss in the circuit can be minimised. In addition, the MOSFET is controlled into the non-conducting state very rapidly in a situation with a short-circuited battery voltage or when the voltage decreases.

The invention claimed is:

1. A polarity protection circuit to be used in a power supply arrangement where a power supply is connected via supply voltage lines to a load, and which polarity protection circuit has a first protective semiconductor switch and a second semiconductor switch, wherein the first protective semiconductor switch is a metal oxide semiconductor field effect transistor, which control voltage is taken via a certain connection from said supply voltage lines, and the second semiconductor switch is a transistor, which gets its control voltage from a point in the supply voltage line, which point is separated from the first semiconductor switch by an inductance, whereby the transistor is arranged to discharge the electric charge from the first semiconductor switch as a response to a change in the polarity of the voltage between the supply voltage lines.

2. A polarity protection circuit according to claim 1, wherein the second semiconductor switch gets its control voltage from a point in the supply voltage line, which point has the most rapid change of potential indicated by an electric charge being due to a polarity change.

3. A polarity protection circuit according to claim 1, wherein the first semiconductor switch has a source (S), a drain (D) and a gate (G), which are connected so that the source (S) is connected to the negative terminal of the load, a coil is connected between the drain (D) and the negative terminal of the power supply, and a resistance is connected between the gate (G) and the positive supply line.

4. A polarity protection circuit according to claim 3, wherein the second semiconductor switch has a base, a collector and an emitter, which are connected so that the base is connected to a diode, which is connected to a point between the coil and the negative terminal of the power supply, the collector is connected to the supply voltage line, which connects the negative terminal of the power supply to the negative terminal of the load, and the emitter is connected to the gate (G) of the first semiconductor switch.

* * * * *